United States Patent
Fok et al.

(10) Patent No.: US 8,320,071 B2
(45) Date of Patent: Nov. 27, 2012

(54) TAPE CARTRIDGE TRAY TRANSMISSION DEVICE APPARATUS WITH RACK AND PINION GEAR ARRANGEMENT

(75) Inventors: Kar Woh Fok, Singapore (SG); Chee Teck Ong, Singapore (SG); Sheau Yeng Wei, Singapore (SG)

(73) Assignee: Venture Corporation Limited, Techplace II (SG)

(*) Notice: Subject to any disclaimer, the term of this patent is extended or adjusted under 35 U.S.C. 154(b) by 117 days.

(21) Appl. No.: 12/921,111

(22) PCT Filed: Mar. 5, 2009

(86) PCT No.: PCT/SG2009/000082
§ 371 (c)(1),
(2), (4) Date: Sep. 3, 2010

(87) PCT Pub. No.: WO2009/110852
PCT Pub. Date: Sep. 11, 2009

(65) Prior Publication Data
US 2011/0000326 A1    Jan. 6, 2011

(30) Foreign Application Priority Data
Mar. 5, 2008    (SG) ................. 200801945-7

(51) Int. Cl.
*G11B 15/68*    (2006.01)

(52) U.S. Cl. .................................................. 360/92.1
(58) Field of Classification Search .............. 360/92.1
See application file for complete search history.

(56) References Cited

U.S. PATENT DOCUMENTS 5,004,393 A * 4/1991 Lunka et al. ............. 414/331.16
5,041,929 A * 8/1991 Fryberger et al. ............. 360/92.1
5,045,958 A * 9/1991 Leonard et al. .............. 360/92.1

FOREIGN PATENT DOCUMENTS

| | | |
|---|---|---|
| EP | 0944078 A1 | 9/1999 |
| EP | 0982723 A2 | 3/2000 |
| EP | 1063646 A2 | 12/2000 |

OTHER PUBLICATIONS

International Search Report for International Application PCT/SG2009/000082 (International Publication Wo 2009/110852): 3 pages, May 15, 2009.

* cited by examiner

*Primary Examiner* — Craig A. Renner
(74) *Attorney, Agent, or Firm* — Beem Patent Law Firm

(57) ABSTRACT

A transmission apparatus for transmitting tapes within a tape library is disclosed. The transmission apparatus comprises a tray for transmitting a tape cartridge. A plurality of pinion gears is provided. The pinion gears are operably connected to each other and are rotatably attached to the tray. A plurality of vertically disposed racks is provided for engagement by the plurality of pinion gears for rotational movement therealong.

19 Claims, 5 Drawing Sheets

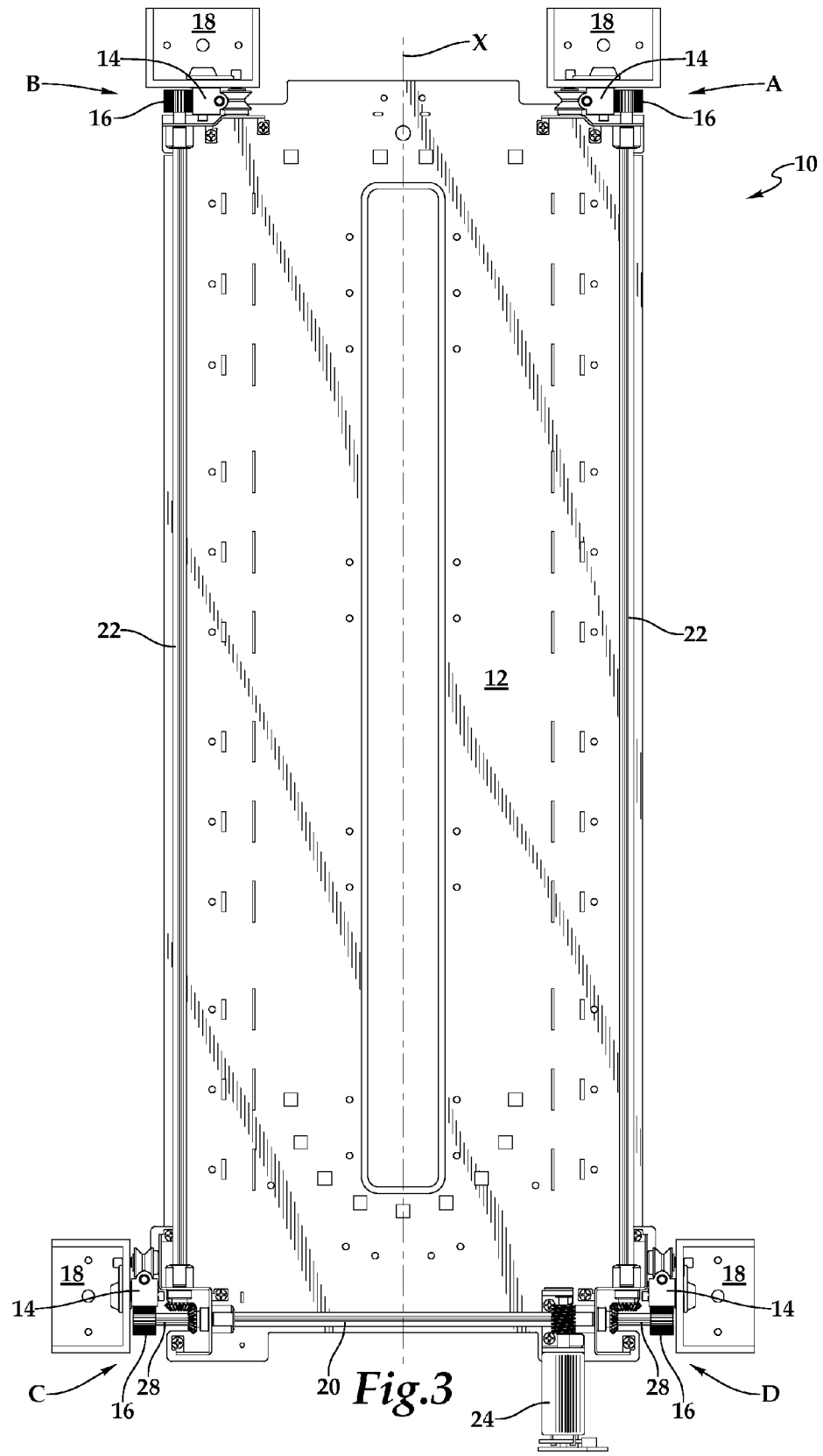

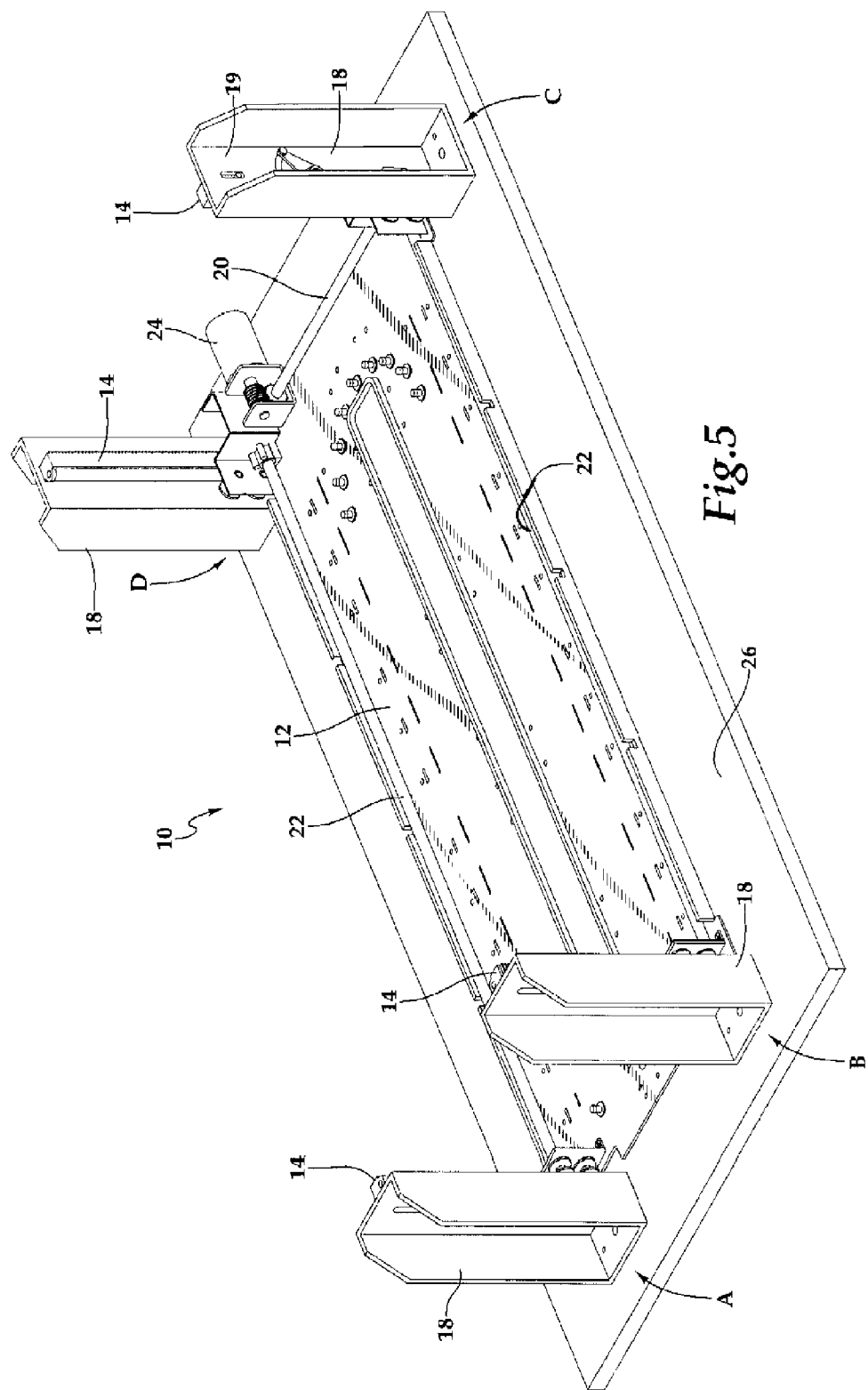

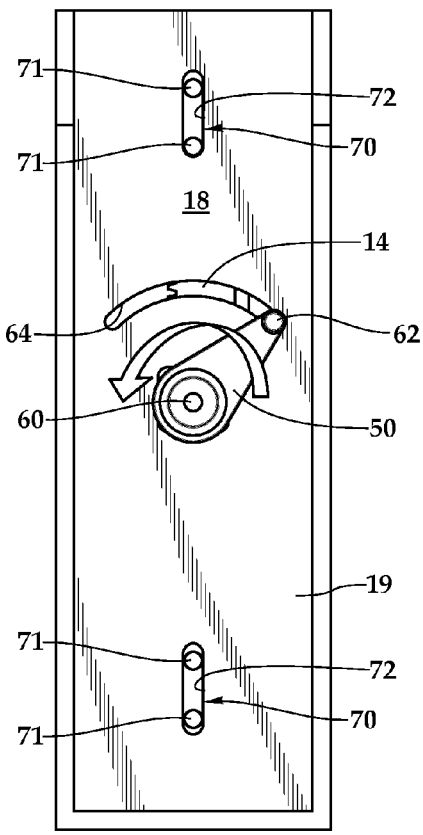
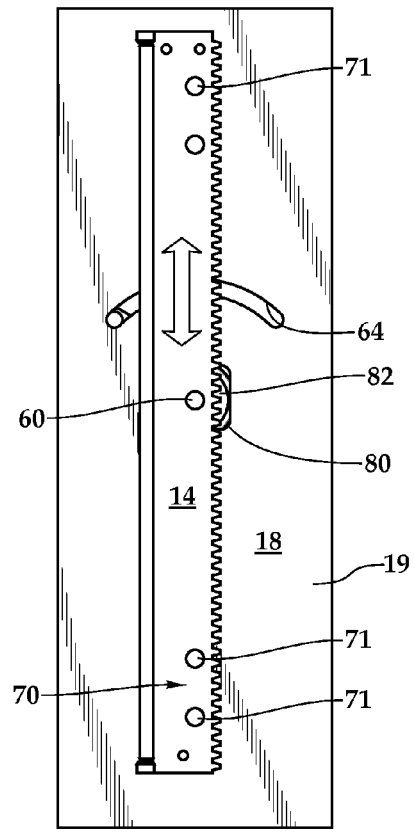
Fig.6    Fig.7
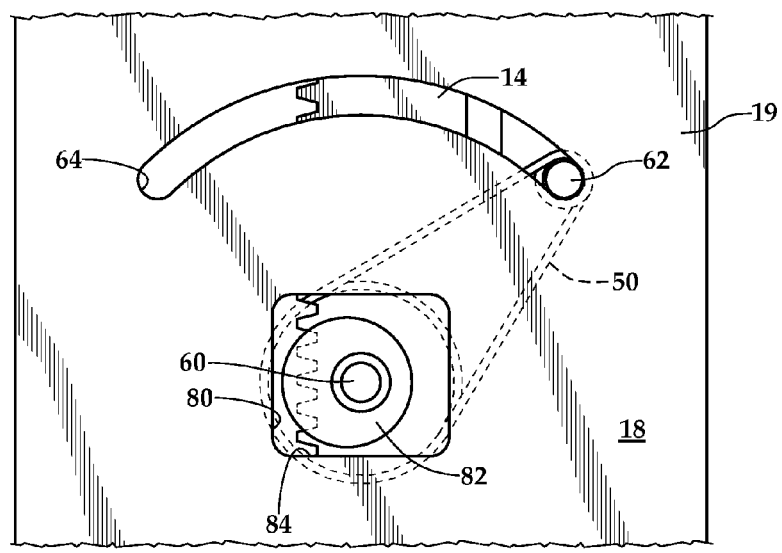
Fig.8

TAPE CARTRIDGE TRAY TRANSMISSION DEVICE APPARATUS WITH RACK AND PINION GEAR ARRANGEMENT

CROSS-REFERENCE TO RELATED APPLICATIONS

This application is a U.S. national stage application of PCT application PCT/SG2009/000082, filed Mar. 5, 2009, and claims the benefit of priority from Singapore patent application 200801945-7, filed Mar. 5, 2008.

TECHNICAL FIELD

This invention relates generally to a transmission apparatus for tape cartridge handling, and relates more particularly, though not exclusively, to a transmission apparatus for tape cartridge handling in a tape library.

BACKGROUND

Loading robots are typically used to load tape cartridges into their respective slots in tape libraries. In order to store as many tape cartridges as possible in a tape library, it is desirable to minimize the space occupied by each slot so as to maximize the number of slots that may be provided in a tape library of a given form factor.

For a small slot size, it is necessary for the loading robot to have precise positioning capabilities so as to be able to correctly insert the tape cartridge with little clearance between the slot and the tape cartridge. It is also desirable for the loading robot to have a low profile so as to take up less space in the tape library and allow more room for storage.

Currently, loading robots are typically driven by linear slides or belt drives. These are adapted to move a tray supporting a tape cartridge up and down with respect to vertical posts. The loading robot also moves horizontally along a defined path of the tray. The tray has to stop at specific heights with great accuracy to enable the loading robot to deposit a tape cartridge into a slot since the slots in a tape library are normally vertically stacked into columns of slots.

There are limitations to using linear slides or belt drives for moving the tray in a loading robot. Although accurate, linear slides are costly to implement. Belt drives are known to stretch after a period of use, thereby losing precision.

To increase storage in a tape library without substantial increases in costs, there thus needs to be a low-cost, precise and robust transmission system to enable the loading robot to work with storage slots that occupy less space.

SUMMARY

A transmission apparatus is provided for use in a tape library. The apparatus has a tray for transporting a tape cartridge and a plurality of pinion gears operably connected to each other and being rotatably attached to the tray. There is also a plurality of vertically disposed racks for engagement by the plurality of pinion gears for rotational movement therealong.

The plurality of pinion gears may be mounted to a plurality of shafts. The plurality of shafts may comprise a drive shaft and a plurality of driven shafts. The plurality of shafts may be operably connected to one another via a bevel gear train between the drive shaft and each of the driven shafts.

The plurality of pinion gears may comprise four pinion gears, each pinion gear being disposed at, immediately adjacent, adjacent or near each one of four corners of the tray.

Each of the plurality of vertically disposed racks may be mounted on a frame. At least two of the plurality of vertically disposed racks may be adjustable relative to their frames for adjusting an incline in the tray. At least one rack of the plurality of vertically disposed racks may be fixed to its frame.

The transmission apparatus may further comprise a sensor for measuring the incline of the tray.

The transmission apparatus may also comprise a plurality of cam-in-slot mechanisms each operably connected to one of the adjustable racks.

According to as second aspect, there is provided a transmission apparatus for use in a tape library. The transmission apparatus may comprise a tray for supporting a tape cartridge, a plurality of pinion gears operably connected to each another and rotatably attached to the tray, a plurality of vertically disposed racks for engagement by the plurality of pinion gears for rotational movement therealong, each of the plurality of vertically disposed racks being mounted on a frame, at least two of the plurality of vertically disposed racks being adjustable relative to their frames for adjusting an incline in the tray, and a plurality of cam-in-slot mechanisms each operably connected to one of the at least two of the plurality of vertically disposed racks.

For all aspects, the slots of the cam-in-slot mechanisms may be located in the frames and the cams of the cam-in-slot mechanisms may be rotatably connected to the adjustable racks. The adjustable racks slideably engage the frames for vertical movement therealong. The vertically disposed racks may be arranged in a first pair oriented in a first direction and a second pair oriented in a second direction. The first pair may be oriented longitudinally outwardly; and the second pair may be oriented laterally outwardly. The plurality of racks may comprise four racks. Each rack may be disposed at, immediately adjacent, adjacent or near each one of four corners of the tray.

According to a third aspect, there is provided tape library comprising the transmission apparatus of the first or second aspects.

BRIEF DESCRIPTION OF THE DRAWINGS

In order that the invention may be fully understood and readily put into practical effect there shall now be described by way of non-limitative example only exemplary embodiments, the description being with reference to the accompanying illustrative drawings.

In the drawings:

FIG. 3 is a schematic plan view of the transmission apparatus of FIG. 1;

FIG. 5 is another perspective schematic view of the transmission apparatus of FIG. 1;

FIG. 6 is a a schematic front view of a frame comprising a cam-in-slot mechanism operably connected to a rack;

FIG. 7 is a schematic rear view of the frame of FIG. 6; and

FIG. 8 is a schematic close-up view of the cam-in-slot mechanism of FIG. 6.

DETAILED DESCRIPTION OF EXEMPLARY EMBODIMENTS

Figure 1:
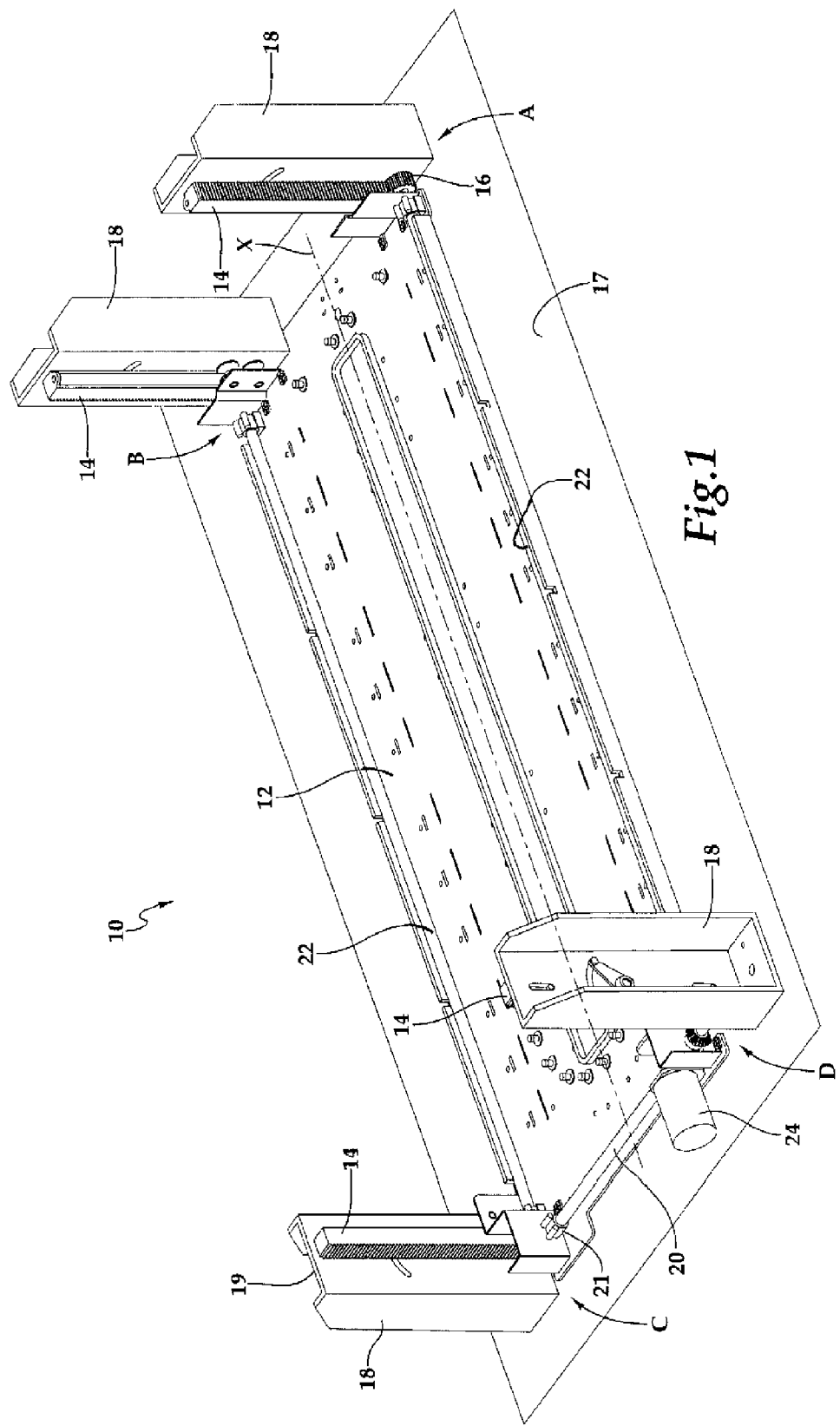
FIG. 1 is a perspective schematic view of an exemplary embodiment of a transmission apparatus.
Figure 2:
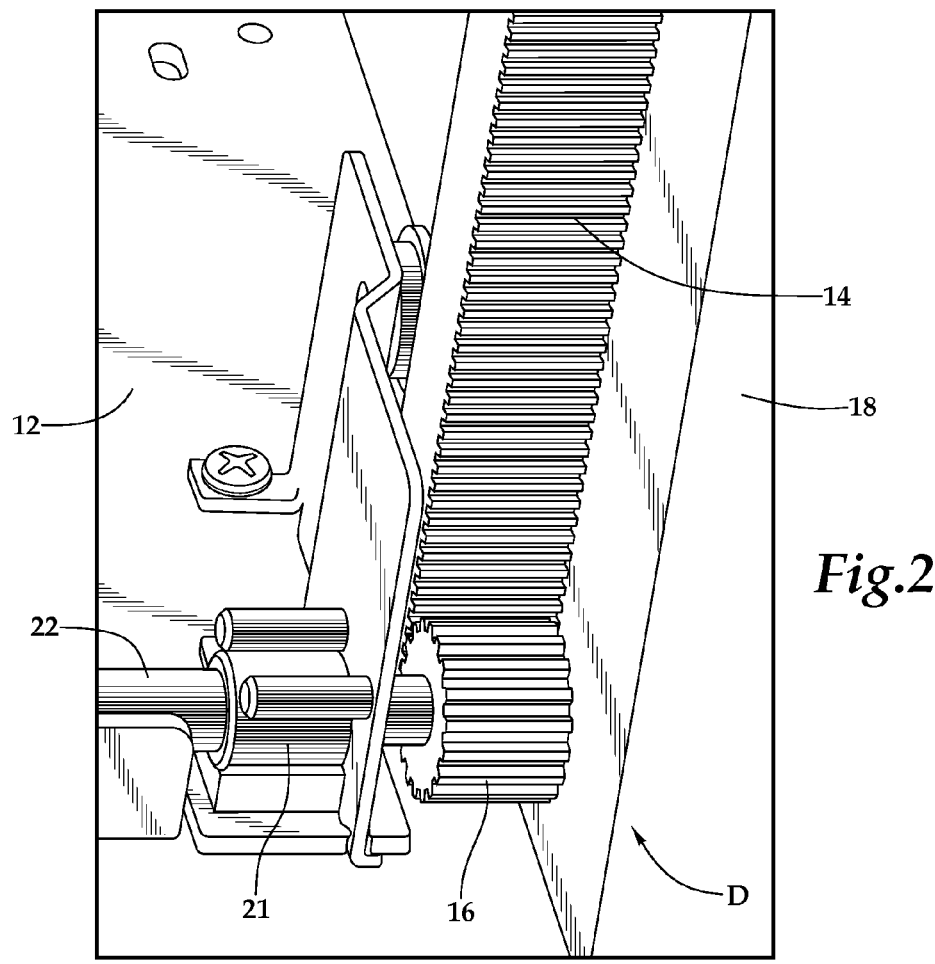
FIG. 2 is a schematic close-up view of a rack-and-pinion gear pair.

FIGS. 1 to 3 show a preferred embodiment of a transmission apparatus 10 that is largely symmetrical about a horizontal axis X. The transmission apparatus 10 includes a rectangular tray 12 for transporting a tape cartridge and a rack 14-and-pinion gear 16 pair at, immediately adjacent, adjacent or near each of the four corners A, B, C, D of the tray 12.

Each rack 14 is vertically mounted to and supported by a frame 18. Each frame 18 constitutes a corner post. They may be of any suitable material or shape provided they are substantially rigid, given their purpose. As shown, each frame 18 is a U-shaped channel member with the racks 14 being securely mounted to a web 19 of each frame 18. Each frame 18 is securely attached to a base 17. The four racks 14 are for being engaged by the four pinion gears 16 rotatably thereal-ong, as shown in FIG. 2.

The pinion gears 16 are mounted on a laterally extending drive shaft 20, and the remote ends of longitudinally extending driven shafts 22. The pinion gears 16 are located on the drive shaft 20 at, immediately adjacent, adjacent or near each end of the drive shaft 20. The drive shaft 20 is driven by a motor 24 mounted to the tray 12. The drive shaft 20 pinion gears 16 are for direct engagement with the relevant racks 14C and 14D. For this, the racks 14C and 14D are oriented with the gears facing longitudinally outwardly in the direction of the X axis, as is shown in FIG. 2.

Figure 4:
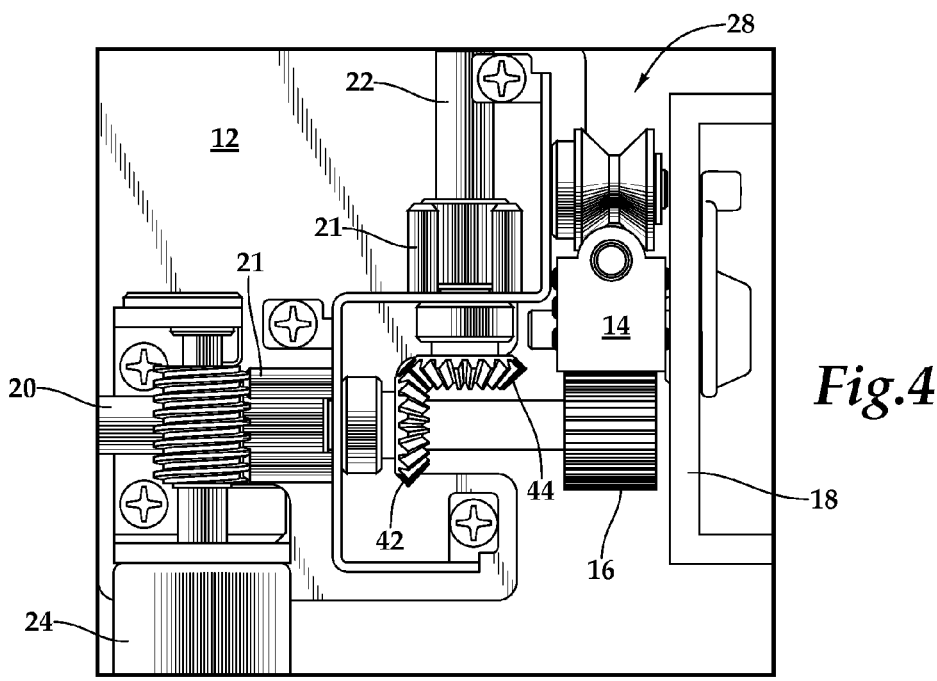
FIG. 4 is a schematic close-up view of a bevel gear train.

Between the drive shaft 20 and each of the driven shafts 22 is a bevel gear train 28, shown in close-up in FIG. 4. A first bevel gear 42 is mounted to each end of the drive shaft 20 intermediate but adjacent the pinion gears 16. The first bevel gears 42 are also spaced from the pinion gears 16. A second bevel gear 44 is mounted to the driven shafts at the ends of the driven shafts 22. As the two bevel gears 42, 44 mesh, rotation of the lateral drive shaft 20 results in simultaneous rotation of the longitudinal driven shafts 22.

Shafts 20, 22 are rotatably mounted to tray 12 by bearing blocks 21 secured to the tray 12, adjacent each end of the shafts 20, 22.

Each of the driven shafts 22 has a pinion gear 14 mounted thereon at, immediately adjacent, adjacent or near the end opposite or remote from the end to which the second bevel gear 44 is mounted. The pinion gears 16 at the remote ends of the driven shafts 22 engage the respective racks 14A and 14B. For this, the racks 14A and 14B are oriented differently to the racks 14C and 14D. The racks 14A and 14B both face laterally outwardly. In this way, rotation of the drive shaft 20 results in simultaneous rotation of all four pinion gears 16. As the four pinion gears 16 simultaneously rotate along their respective racks 14, vertical movement of the tray 12 is effected. By providing a rack 14-and-pinion gear 16 pair at each of the four corners A, B, C, D of the tray 12, and having the four rack 14-and-pinion gear 16 pairs identical, precise and controlled vertical movement of the tray may be achieved. This makes the transmission apparatus 10 suitable for use with reduced slot sizes since the tray 12 may be precisely positioned.

A further embodiment of the transmission apparatus 10 is depicted in FIG. 5 which shows the frames 18 mounted onto a base plate 26. In this embodiment, the rack 14 at corner D is fixed to its frame 18. The racks 14 at corners A, B, C and D are adjustable with respect to their frames 18. However, a rack 14 at one corner only may not be adjustable, if required or desired.

FIGS. 6 to 8 show close-ups of a cam-in-slot mechanism for adjusting a rack 14 with respect to a frame 18 in order to adjust or tune the incline of the tray 12. This allows the tray 12 to be levelled at all the four corners A, B, C and D so that the tray 12 is level at all four corners. This would normally mean that the tray 12 is perpendicular to the four frames 18. Allowing the incline of the tray 12 to be adjusted or tuned provides improved positioning accuracy of the tray 12 across the entire length or breadth of the tape library.

As shown in FIGS. 6 to 8, the adjustable rack 14 is slidably attached to the frame 18 via vertically oriented pin-in-slot connections 70. In a preferred embodiment, pins 71 of the pin-in-slot connections 70 are provided on the rack 14 while the slots 72 are provided in the frame 18. For each pin-in-slot connection 70, two pins 71 may be provided to engage one slot 72 for added rigidity. The adjustable rack 14 is thus constrained to move only vertically with respect to the frame 18, as indicated by the arrow in FIG. 7, and the extent of the vertical movement is limited by the vertical height of the slots 72.

A cam lever 50 is rotatably attached to the adjustable rack 14 through a cam slot 80 in the web 19 of the frame 18. In this way, the cam lever 50 is on one side of the web 19 of the frame 18 while the rack 14 is on the other side of the web 19 of the frame 18. The cam lever 50 has a centre of rotation 60 and a guide pin 62 that is constrained to move within a curved guide slot 64. The cam lever 50 is rotatably attached to the rack 14 at its centre of rotation 60.

Also attached to the cam lever 50 is a cam 82. The cam 82 is a simple circular disc that has its geometrical centre offset from the centre of rotation 60 of the cam lever 50, as shown in FIG. 8 (for clarity, cam lever 50 has been rendered transparent). The offset cam 82 acts against a side 84 of the cam slot 80, such that rotation of the cam lever 50 (as shown by the curved arrow in FIG. 6) results in vertical movement of the rack (as shown by the arrow in FIG. 7). In this way, each of the corners A, B, C of the tray 12 may be adjusted for height with respect to corner D in order to tune the incline of the tray 12. Also, this is to allow for adjustment if the pinion gear 16 engages incorrect teeth of the rack 14, thereby creating a misalignment. A sensor (such as a laser meter or measurement gauge commonly used in printers to control pen-to-paper spacing) may be provided to measure the incline of the tray and allow fine adjustments so as to achieve maximum "horizontalness" of the tray 12 with respect to a vertical axis.

In all the embodiments, the various mechanical parts of the transmission apparatus 10 such as the rack 14-and-pinion gear 16 pairs, the drive shafts 20, 22 and the bevel gear trains 28 are preferably inexpensive, off-the-shelf components. This not only reduces costs, but may also reduce the weight of the transmission apparatus 10.

Whilst there has been described in the foregoing description exemplary embodiments of the present invention, it will be understood by those skilled in the technology concerned that many variations in details of design, construction and/or operation may be made without departing from the present invention. For example, the motor may be directly connected to one of the driven shafts 22 instead of to the drive shaft 20. The rack 14-and-pinion gear 16 pairs may be located at the sides instead of at the corners of the tray 12, so that only three pairs 14, 16 are provided at three sides of the tray 12, leaving one side of the tray 12 open for loading and unloading tape cartridges. The adjustable racks 14 may engage the frames by providing appropriate tongue-in-groove adaptations on the racks 14 and the frames 18 instead of the pin-in-slot connections 70.

The invention claimed is:

1. A transmission apparatus for use in a tape library, the transmission apparatus comprising:
    a tray for transporting a tape cartridge;
    a plurality of pinion gears operably connected to each other and rotatably attached to the tray, the plurality of pinion gears are mounted to a plurality of shafts, the plurality of shafts comprising a drive shaft and a plurality of driven shafts; and a plurality of vertically disposed racks for engagement by the plurality of pinion gears for rotational movement therealong.

2. The transmission apparatus of claim 1, wherein the plurality of shafts are operably connected to one another via a bevel gear train between the drive shaft and each of the driven shafts.

3. The transmission apparatus of claim 1, wherein the plurality of pinion gears comprise four pinion gears, each pinion gear being disposed relative to each one of four corners of the tray in a manner selected from the group consisting of: at, immediately adjacent, adjacent and near.

4. The transmission apparatus of claim 1, wherein the plurality of racks comprise four racks, each rack being disposed relative to each one of four corners of the tray in a manner selected from the group consisting of: at, immediately adjacent, adjacent and near.

5. The transmission apparatus of claim 1, wherein each of the plurality of vertically disposed racks is mounted on a frame; at least two of the plurality of vertically disposed racks being adjustable relative to their frames for adjusting an incline in the tray.

6. The transmission apparatus of claim 5, wherein at least one rack of the plurality of vertically disposed racks is fixed to its frame.

7. The transmission apparatus of claim 5, further comprising a plurality of cam-in-slot mechanisms each operably connected to one of the adjustable racks.

8. The transmission apparatus of claim 7, wherein slots of the cam-in-slot mechanisms are located in the frames and cams of the cam-in-slot mechanisms are rotatably connected to the adjustable racks.

9. The transmission apparatus of claim 8, wherein the adjustable racks slideably engage the frames for vertical movement therealong.

10. The transmission apparatus of claim 1, wherein the vertically disposed racks are arranged in a first pair oriented in a first direction and a second pair oriented in a second direction.

11. The transmission apparatus of claim 10, wherein the first pair are oriented longitudinally outwardly; and the second pair are oriented laterally outwardly.

12. A tape library comprising the transmission apparatus of claim 1.

13. A transmission apparatus for use in a tape library, the transmission apparatus comprising:

a tray for supporting a tape cartridge;

a plurality of pinion gears operably connected to each another other and rotatably attached to the tray;

a plurality of vertically disposed racks for engagement by the plurality of pinion gears for rotational movement therealong, each of the plurality of vertically disposed racks being mounted on a frame, at least two of the plurality of vertically disposed racks being adjustable relative to their frames for adjusting an incline in the tray; and a plurality of cam-in-slot mechanisms each operably connected to one of the at least two of the plurality of vertically disposed racks.

14. The transmission apparatus of claim 13, wherein slots of the cam-in-slot mechanisms are located in the frames and cams of the cam-in-slot mechanisms are rotatably connected to the adjustable racks.

15. The transmission apparatus of claim 14, wherein the adjustable racks slideably engage the frames for vertical movement therealong.

16. The transmission apparatus of claim 13, wherein the vertically disposed racks are arranged in a first pair oriented in a first direction and a second pair oriented in a second direction.

17. The transmission apparatus of claim 16, wherein the first pair are oriented longitudinally outwardly; and the second pair are oriented laterally outwardly.

18. The transmission apparatus of claim 13, wherein the plurality of racks comprise four racks, each rack being disposed relative to each one of four corners of the tray in a manner selected from the group consisting of: at, immediately adjacent, adjacent and near.

19. A tape library comprising the transmission apparatus of claim claim 13.

* * * * *